(12) United States Patent
Zhang

(10) Patent No.: US 7,353,648 B2
(45) Date of Patent: Apr. 8, 2008

(54) ROBUST EGR CONTROL FOR COUNTERACTING EXHAUST BACK-PRESSURE FLUCTUATION ATTRIBUTABLE TO SOOT ACCUMULATION IN A DIESEL PARTICULATE FILTER

(75) Inventor: Gregory Guoqing Zhang, Lisle, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 556 days.

(21) Appl. No.: 11/011,959

(22) Filed: Dec. 14, 2004

(65) Prior Publication Data

US 2006/0123773 A1 Jun. 15, 2006

(51) Int. Cl.
*F01N 3/00* (2006.01)

(52) U.S. Cl. .................. 60/278; 60/274; 60/295; 60/297; 60/311

(58) Field of Classification Search .......... 60/274, 60/278, 285, 295, 297, 311
See application file for complete search history.

(56) References Cited

U.S. PATENT DOCUMENTS

| | | | | |
|---|---|---|---|---|
| 4,091,615 A | * | 5/1978 | Hayashi et al. | 60/274 |
| 5,228,287 A | * | 7/1993 | Kuronishi et al. | 60/276 |
| 5,233,829 A | * | 8/1993 | Komatsu | 60/276 |
| 5,337,558 A | * | 8/1994 | Komatsu | 60/276 |
| 5,732,552 A | * | 3/1998 | Matsumoto et al. | 60/276 |
| 6,829,890 B2 | * | 12/2004 | Gui et al. | 60/295 |
| 2004/0031262 A1 | | 2/2004 | Gui et al. | |

* cited by examiner

Primary Examiner—Thomas Denion
Assistant Examiner—Diem Tran
(74) Attorney, Agent, or Firm—Jeffrey P. Calfa; Gerald W. Aakew

(57) ABSTRACT

An engine (10) uses a method for counteracting the effect of soot accumulation in a diesel particulate filter (DPF 38) in a diesel engine exhaust system (16) on the control of exhaust gas recirculation (EGR) through an EGR system (40). Engine speed (N) and indicated engine torque (TQI) data are processed to select from a map (62) a data value for present EGR volumetric efficiency. The selected data value and certain other data, including data that accounts for present soot accumulation in the DPF, are processed to develop a data value indicative of present total mass flow. The data value indicative of present total mass flow and still other data are processed to develop flow control data for controlling flow of exhaust gas through the EGR system.

25 Claims, 3 Drawing Sheets

ROBUST EGR CONTROL FOR COUNTERACTING EXHAUST BACK-PRESSURE FLUCTUATION ATTRIBUTABLE TO SOOT ACCUMULATION IN A DIESEL PARTICULATE FILTER

FIELD OF THE INVENTION

This invention relates to diesel engines having diesel particulate filters (DPF's) that collect entrained soot from exhaust gases passing through their exhaust systems to prevent the collected soot from becoming tailpipe emissions.

BACKGROUND OF THE INVENTION

A known electronic engine control system comprises a processor-based engine controller that processes data from various sources to develop control data for controlling certain functions of the engine. Air and fuel management and recirculation of exhaust gas are examples of functions that are controlled by an engine control system. In a turbocharged diesel engine, the electronic engine control system also exercises control over turbocharger boost.

An important element of an emission control strategy in an engine involves the controlled recirculation of some exhaust gas to limit in-cylinder temperatures and hence limit the formation of NOx. Control of recirculated exhaust gas is performed by an exhaust gas recirculation (EGR) system that typically includes an EGR valve that is controlled by the engine control system. Variable valve actuation of engine cylinder valves may also be used for control of EGR.

An exhaust system of a diesel engine that comprises a DPF is capable of physically trapping diesel particulate matter (DPM) in engine exhaust gas passing through the exhaust system. This trapping of DPM prevents significant amounts of DPM from entering the atmosphere.

DPM includes soot or carbon, the soluble organic fraction (SOF), and ash (i.e. lube oil additives etc.). The trapping of those constituents by a DPF prevents what is sometimes seen as black smoke billowing from a vehicle's exhaust pipe. The organic constituents of trapped DPM, i.e. carbon and SOF, are oxidized within the DPF at appropriate times and under appropriate conditions to form $CO_2$ and $H_2O$, which can then pass through and exit the exhaust pipe to atmosphere. The ash collects within the DPF over time, progressively aging the DPF by gradually reducing its trapping efficiency.

A process commonly called regeneration counteracts increasing EBP by burning off accumulated soot in a DPF. Commonly owned U.S. patent application Ser. No. 10/217,729, filed 13 Aug. 2002, (Published Application No. US20040031262A1) describes both a natural regeneration process and a forced regeneration process. The latter process occurs whenever the level of accumulated soot becomes undesirably high and involves the use of the engine control system to raise exhaust gas temperature to a range that is high enough to burn off the accumulated soot. Natural regeneration may occur at any time during normal engine operation when temperatures that are sufficiently high to burn off soot occur in a DPF.

Factors that include a) possible natural regeneration at various times during normal engine operation when forced regeneration is not occurring, b) forced regeneration cycles when too much soot has been accumulated, and c) changing rate at which soot accumulates in a DPF due to aging, can cause variations in the manner in which a DPF performs as an engine operates. It appears that certain implications of these variations on other aspects of engine performance have not been fully appreciated.

SUMMARY OF THE INVENTION

The present invention relates to engines that employ systems and methods to account for the effect of soot accumulation in a DPF on EGR control strategy. Other parameters that influence EBP being constant, changes in soot accumulation in a DPF and changes in DPF trapping efficiency can affect EGR control strategy.

The present invention is implemented by the introduction of certain data into memory of a processor in an engine control system. The processor executes an algorithm that utilizes that data to correct EGR volumetric efficiency data for fluctuations in EBP due to changing soot accumulation in a DPF as the engine operates.

Accordingly, one generic aspect of the present invention relates to a method for counteracting the effect of soot accumulation in a DPF in an exhaust system of a diesel engine on the control of exhaust gas recirculation (EGR) through an EGR system of the engine by a control system of the engine.

The method comprises a) processing certain data to select a data value for present EGR volumetric efficiency that is based on a predetermined relationship between certain parameters associated with operation of the engine, b) processing the selected data value for present EGR volumetric efficiency and certain other data, including data that accounts for present soot accumulation in the DPF, to develop a data value indicative of present total mass flow through the engine during engine operation, and c) processing the data value indicative of present total mass flow through the engine and still other data to develop flow control data for controlling flow of exhaust gas through the EGR system.

The flow control data is used for controlling flow of recirculated exhaust gas.

Another generic aspect relates to an engine that performs the method just described.

Still another generic aspect relates to a system that performs the described method.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
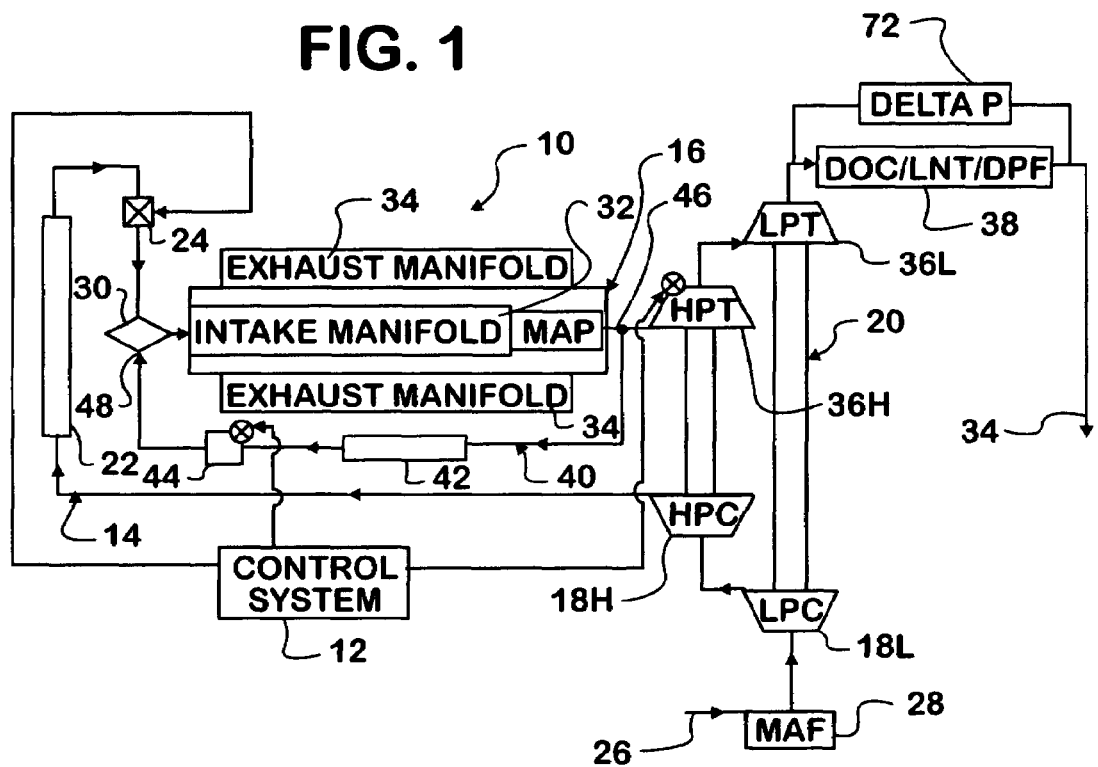
FIG. 1 is a general schematic diagram of portions of an exemplary diesel engine relevant to principles of the present invention.

FIG. 1 shows a schematic diagram of an exemplary diesel engine 10 for powering a motor vehicle. Engine 10 has a processor-based engine control system 12 that comprises one or more processors for processing data from various sources to develop various control data for controlling various aspects of engine operation. The data processed by control system 12 may originate at external sources, such as sensors, and/or be generated internally.

Control system 12 exercises control over various aspects of engine operation including mass airflow into the engine, engine fueling, and exhaust gas recirculation (EGR).

Engine 10 comprises an intake system 14 and an exhaust system 16. Intake system 14 comprises low- and high-pressure stages 18L, 18H of a compressor of a two-stage turbocharger 20, an air/air charge cooler, sometimes called a charge air cooler or intercooler, 22 that is downstream of the compressor stages, and an intake throttle valve 24 that is downstream of charge cooler 22.

Intake system 16 begins at an air inlet 26 upstream of the turbocharger compressor, and it is there that air enters the intake system. For measuring airflow into intake system 16, a mass airflow (MAF) sensor 28 is disposed proximate inlet 26.

Air entering inlet 26 passes through the turbocharger compressor stages, then charge cooler 22, and then throttle valve 24 before entering an inlet of an EGR mixer 30 where some recirculated exhaust gas is added to the charge air before the mixture enters an intake manifold 32 of the engine serving cylinder intake valves that open at appropriate times during the engine cycles to allow charge air to enter the cylinders.

Engine fueling may be controlled by the control of parameters governing the operation of electric-actuated fuel injectors that inject fuel into the engine cylinders where it ignites by the heat of compression imparted to the charge air during compression strokes.

Products of combustion pass through exhaust system 16. The exhaust system shown assumes a V-type engine having two exhaust manifolds 34 into which products of combustion from respective cylinder banks pass via engine exhaust valves that open and close at proper times during engine cycles.

Turbocharger 22 further comprises a two-stage turbine operated by the hot exhaust gases passing through exhaust system 16 and coupled with the compressor stages. When control system 12 requests boost, turbocharging is performed by the turbine stages 36H, 36L causing compressor stages 18H, 18L to impart boost to the charge air passing through intake system 14.

Exhaust system 16 further comprises an exhaust treatment device designated by the general reference numeral 38. Device 38 comprises at least a DPF, and may further comprise associated elements like a diesel oxidation catalyst (DOC), lean NOx trap (LNT) and a $NO_X$ adsorber catalyst, either integrated with or separate from the DPF.

EGR is performed by control system 12 controlling an EGR system 40 that comprises an EGR cooler 42 and an EGR valve 44 in series between an inlet 46 communicated to the exhaust system to allow exhaust gases coming from the exhaust manifolds to enter and an outlet 48 where exhaust gases exit to EGR mixer 30.

Figure 2:
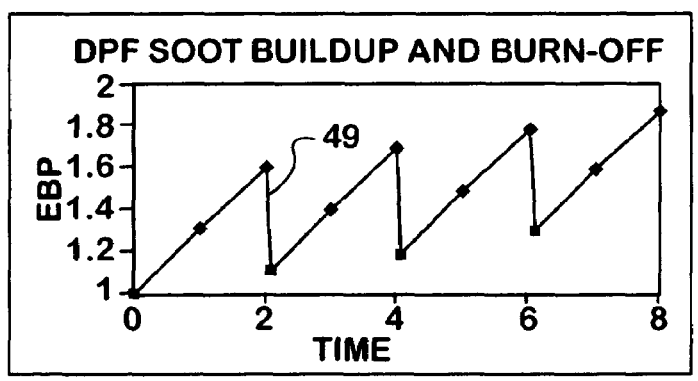
FIG. 2 is a graph plot showing a representative time trace of EBP.

FIG. 2 shows a representative trace 49 of EPB versus time where the effects of engine operation other than soot accumulation in DPF 38 have been removed. As the engine runs, soot accumulation will gradually increase until regeneration of DPF 38 occurs. One way of indicating a need for forcing regeneration is by measurement of pressure drop across DPF 38. Such measurement may be performed by any suitably appropriate means, recognizing that such measurement really indicates the extent of resistance to flow that the DPF imposes on exhaust gas because other aspects of engine operation such as changing mass flow through the engine affect the pressure drop across the DPF.

Figure 3:
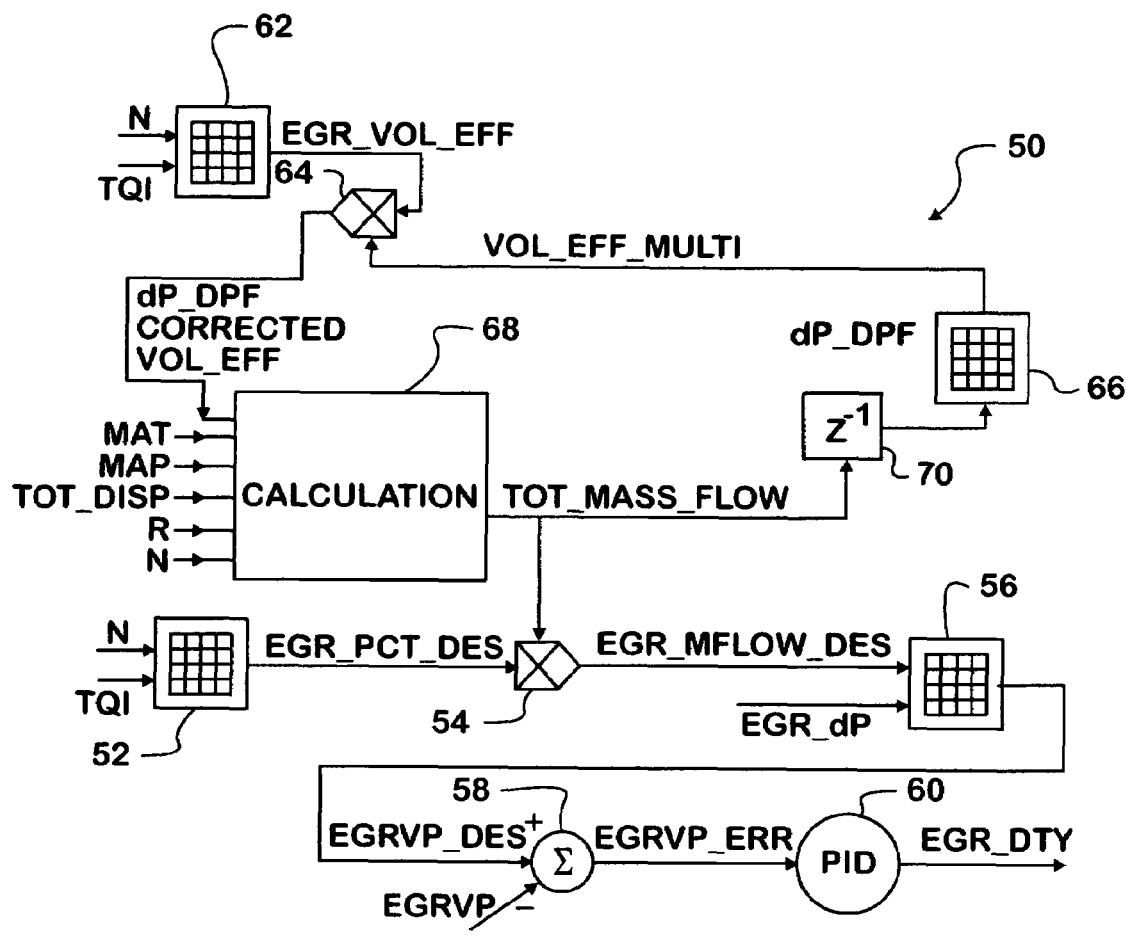
FIG. 3 is a software strategy diagram of a first exemplary implementation of the inventive strategy in the engine control system of FIG. 1.

FIG. 3 illustrates an EGR control strategy 50 implemented in a processor of control system 12 for counteracting the influence of soot accumulation in DPF 38. The basic control strategy comprises a map, or look-up table, 52 containing data values for desired EGR percentage, EGR_PCT_des, meaning data values for the percentage of EGR that is desired in the EGR/air charge in intake manifold 32. Each data value for EGR_PCT_des is correlated with a set of data values for engine speed N and indicated engine torque TQI. The correlation may be defined in terms of data values for N and TQI falling within portions of respective ranges of possible engine speed and possible indicated engine torque. Indicated engine torque is proportional to the area within the P-V (cylinder pressure-volume) diagram. It is essentially the useful torque being produced by the engine, corresponding to the torque at the clutch for propelling the vehicle plus torques used for other purposes such operating a torque converter and engine-driven accessories like alternators and fuel pumps, and overcoming engine rotating friction.

The processor processes data values for present engine speed and present indicated engine torque according to map 52 to select from the map a data value for EGR_PCT_des that is correlated with the data value for present engine speed N and the data value for present indicated engine torque TQI. Data values for present engine speed and present indicated torque are obtained in any suitably appropriate way, such as from data that is frequently published on a data bus.

The selected data value for EGR_PCT_des efficiency is multiplied by a data value for total mass flow through engine 10, Tot_mass_flow. It is the data value for Tot_mass_flow that is corrected to account for soot accumulation in DPF 38. How that correction is made will be explained shortly. The product of the multiplication becomes a data value for a parameter designated EGR_Mflow_des, meaning desired EGR mass flow that should be entering EGR mixer 30.

The strategy comprises a further map, or look-up table, 56 containing data values for a parameter EGRVP_des representing the extent to which EGR valve 44 is open. Each data value corresponds to a particular position of a movable valve element, such as a valve pintle, relative to a seat on which the movable element seats when closing the EGR valve to flow. The farther the movable element moves away from the seat, the more the valve opens.

A parameter that is indicative of pressure across EGR valve 44 is also utilized in this implementation of the strategy to develop the data value for EGRVP_des. The difference between EBP, as measured by a suitable sensor at an exhaust manifold 34, and manifold absolute pressure (MAP), as measured by a MAP sensor at intake manifold 32, may be used to approximate pressure across EGR valve 44.

Each data value for EGRVP_des is correlated with a set of data values for EGR_Mflow_des and EGR_dp. The correlation may be defined in terms of data values for EGR_Mflow_des and EGR_dp falling within portions of respective ranges of possible desired EGR mass flow and possible pressure drop.

The selected data value for EGRVP_des forms an input for a closed-loop control function where the control loop is closed at an algebraic summing function 58 by the data value for a parameter EGRVP representing actual position of the movable valve element, as obtained from a position sensor associated with EGR valve 44. The data value for the resulting error signal EGRVP_err is processed by a P-I-D (proportional, integral, derivative) control function 60 that constantly seeks to position the movable valve element to a position that will reduce the error signal to zero.

How the data value for Tot_mass_flow is corrected to account for soot accumulation in DPF 38 can now be explained. The correction strategy comprises a map, or look-up table, 62 containing data values for EGR volumetric efficiency, each of which is correlated with a set of data values for engine speed N and indicated engine torque TQI. The correlation may be defined in terms of data values for N and TQI falling within portions of respective ranges of possible engine speed and possible indicated engine torque. EGR volumetric efficiency is represented by a parameter EGR_Vol_Eff.

The processor processes data values for present engine speed N and present indicated engine torque TQI according to map 62 to select from the map a data value for EGR_Vol_Eff that is correlated with the data value for present engine speed N and the data value for present indicated engine torque TQI. A multiplication function 64 multiplies the selected data value for EGR_Vol_Eff by a data value for a multiplier Vol_eff_multi selected from a map 66.

The data value for the resulting product of the multiplication is the data value of a parameter dP_dpf_correctedVol_eff, and that data value is processed, along with present data values for certain other parameters, according to a calculation function 68 to develop a data value for total mass flow Tot_mass_flow. Those certain other parameters are the absolute temperature of the charge air in intake manifold 32 as measured in any suitably appropriate way (MAT), the absolute pressure of the charge air in the intake manifold as measured by a MAP sensor (MAP), engine displacement TOT_disp, the Gas Constant R, and engine speed N. The data value for Tot_mass_flow is also stored in a store 70 that provides the stored value to map 66.

Map 66 contains data values for the multiplier Vol_eff_multi, each correlated with a respective set of data values for total mass flow and pressure drop across DPF 38. The data value for pressure drop across DPF 38 may be measured in any suitably appropriate way, such as by a pressure sensor 72. The correlation may be defined in terms of data values for Tot-mass-flow and dP_DPF falling within portions of respective ranges of possible total mass flow and possible pressure drop.

Figure 4:
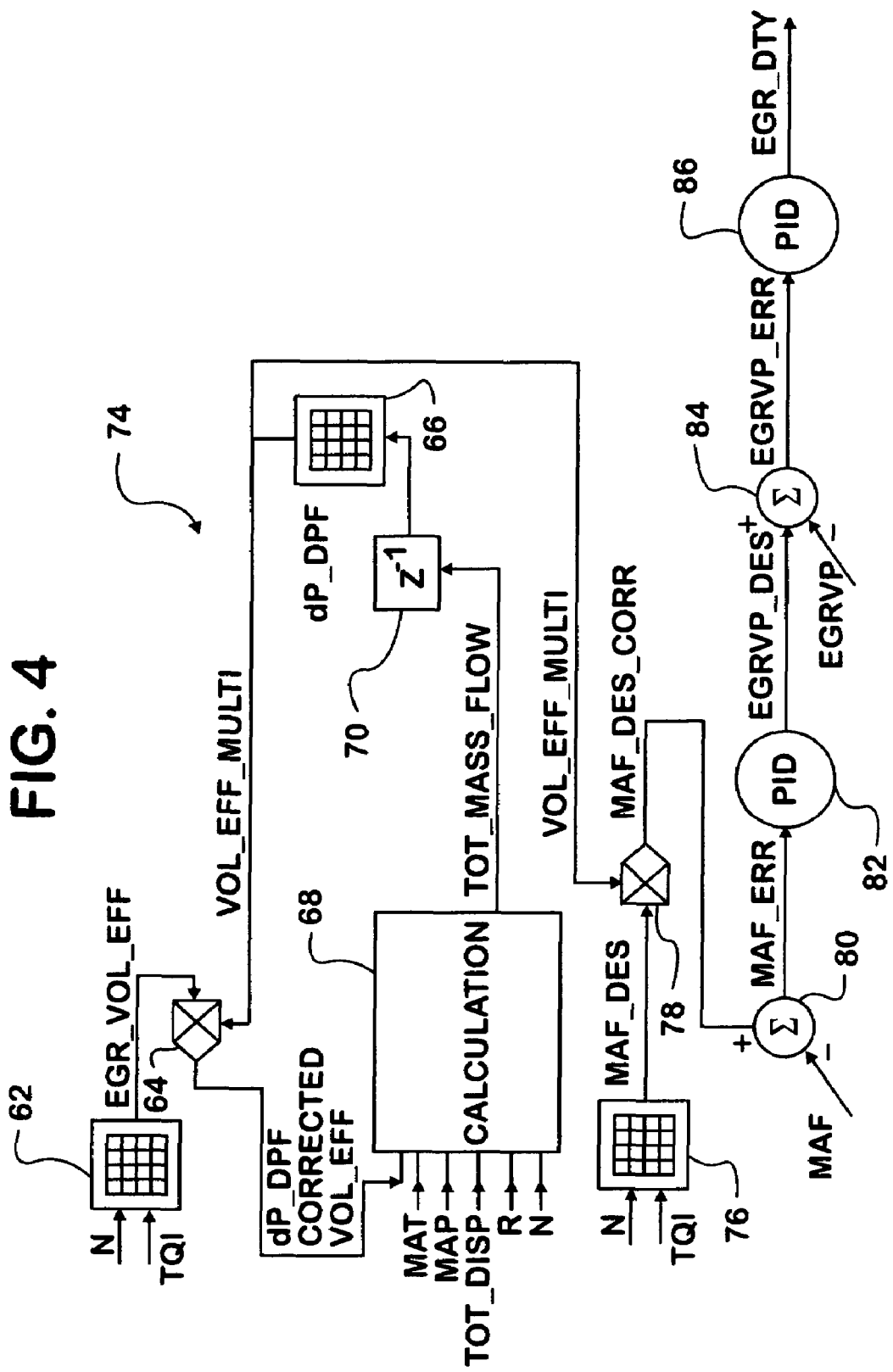
FIG. 4 is a software strategy diagram of a second exemplary implementation of the inventive strategy in the engine control system of FIG. 1.

FIG. 4 illustrates another embodiment for EGR control strategy 74 that can be implemented in the processor of control system 12 for counteracting the influence of soot accumulation in DPF 38. The basic control strategy is premised on EGR flow and mass air flow being a function of engine speed and indicated engine torque that has a constant value at a given engine speed and indicated engine torque. Consequently for any given engine speed and indicated engine torque, EGR flow error creates a corresponding error in mass air flow that allows mass air flow error to be used as a control input for closed-loop control of the position of the movable valve element of the EGR valve.

The strategy comprises a map, or look-up table, 76 containing data values for desired mass airflow MAF_des, meaning the desired mass airflow entering at air inlet 26. Each data value for MAF_des is correlated with a set of data values for engine speed N and indicated engine torque TQI. The correlation may be defined in terms of data values for N and TQI falling within portions of respective ranges of possible engine speed and possible indicated engine torque.

The processor processes data values for present engine speed and present indicated engine torque according to map 76 to select from the map a data value for MAF_des that is correlated with the data value for present engine speed N and the data value for present indicated engine torque TQI.

FIG. 4 shows that a data value for the volumetric efficiency multiplier Vol_eff_multi is obtained in the same way as in FIG. 3. A multiplication function 78 multiplies the selected data value for MAF_des by a data value for the volumetric efficiency multiplier Vol_eff_multi obtained from map 66. The product of the multiplication becomes a data value for a parameter designated MAF_des_corr, meaning corrected desired mass airflow.

The data value for MAF_des_corr forms an input for a closed-loop control function where the control loop is closed at an algebraic summing function 80 by the data value for a parameter MAF representing actual mass airflow into the intake system as measured by MAF sensor 28. The data value for the resulting error signal MAF_err is processed by a P-I-D (proportional, integral, derivative) control function 82 that slaves the EGR system to the corrected mass airflow by positioning the movable element of EGR valve 44 through use of the parameter EGRVP_des As in FIG. 3, the data value for EGRVP_des forms an input for a closed-loop control function where the control loop is closed at an algebraic summing function 84 by the data value for the parameter EGRVP. The data value for the resulting error signal EGRVP_err is processed by a P-I-D (proportional, integral, derivative) control function 86 that constantly seeks to position the movable valve element to a position that will reduce the error signal to zero.

Data values for the various maps such as 52, 56, 62, 66, and 76 can be developed by testing.

While a presently preferred embodiment of the invention has been illustrated and described, it should be appreciated that principles of the invention apply to all embodiments falling within the scope of the following claims.

What is claimed is:

1. A method for counteracting the effect of soot accumulation in a diesel particulate filter (DPF) in an exhaust system of a diesel engine on the control of exhaust gas recirculation (EGR) through an EGR system of the engine by a control system of the engine, the method comprising:
   in the control system,
   a) processing certain data to select a data value for present EGR volumetric efficiency that is based on a predetermined relationship between certain parameters associated with operation of the engine,
   b) processing the selected data value for present EGR volumetric efficiency and certain other data, including data that accounts for present soot accumulation in the DPF, to develop a data value indicative of present total mass flow through the engine during engine operation, and
   c) processing the data value indicative of present total mass flow through the engine and still other data to develop flow control data for controlling flow of exhaust gas through the EGR system, and
   in the EGR system,
   using the flow control data for controlling flow of exhaust gas.

2. A method as set forth in claim 1 wherein step a) comprises processing certain data to select a data value for present EGR volumetric efficiency that is based a relationship of EGR flow being proportional to the square root of the difference between pressure in an exhaust manifold of the engine and pressure in an intake manifold of the engine.

3. A method as set forth in claim 1 wherein step a) comprises processing certain data to select a data value for present EGR volumetric efficiency that is based on a relationship of the sum of EGR flow and mass airflow into the engine being a constant at any given combination of EGR flow and mass airflow.

4. A method as set forth in claim 1 wherein step a) comprises processing data values for present engine speed and present indicated engine torque according to a map containing data values for EGR volumetric efficiency, each of which is correlated with a set of data values for engine speed and indicated engine torque, to select from the map a data value for present EGR volumetric efficiency that is correlated with the data value for present engine speed and the data value for present indicated engine torque.

5. A method as set forth in claim 4 wherein step b) comprises processing a data value for present pressure drop across the DPF according to a multiplier map containing data values for a multiplier, each of which is correlated with a data value for pressure drop across the DPF, to select from the multiplier map a data value for the multiplier that is correlated with the data value for present pressure drop across the DPF, multiplying the selected data value for present EGR volumetric efficiency by the data value for the selected multiplier to develop a data value for the product of the multiplication, and using the data value for the product of the multiplication as the data value for the data accounting for present soot accumulation in the DPF.

6. A method as set forth in claim 5 wherein step c) comprises
   i) multiplying the data value indicative of present total mass flow through the engine and a data value for desired EGR percentage to develop a data value for desired EGR mass flow,
   ii) processing the data value for desired EGR mass flow and a data value indicative of present pressure drop across an EGR valve in the EGR system according to a valve control map containing data values for an amount of opening for the EGR valve, each of which is correlated with a set of data values for desired EGR mass flow and pressure drop across the EGR valve, to select from the valve control map a data value for amount of opening correlated with the data value for desired EGR mass flow and the data value indicative of present pressure drop across the EGR valve, and
   in the EGR system, causing the EGR valve to be open in an amount correlated with the selected data value for the amount of opening.

7. A method as set forth in claim 6 wherein the data value for desired EGR percentage is developed by processing data values for present engine speed and present indicated engine torque according to an EGR percentage map containing data values for desired EGR percentage, each of which is correlated with a set of data values for engine speed and indicated engine torque, to select from the EGR percentage map a data value for desired EGR percentage that is correlated with the data values for present engine speed and present indicated engine torque.

8. A method as set forth in claim 5 wherein step c) comprises
   i) multiplying the data value for the product of the multiplication and a data value for desired mass airflow through the engine to develop a data value for corrected desired mass airflow through the engine,
   ii) processing the data value for corrected desired mass airflow through the engine and a data value indicative of actual mass airflow through the engine to develop a data value for a mass airflow error signal,
   iii) processing the data value for the mass airflow error signal through a proportional-integral-derivative control function to develop a data value for an amount of opening of an EGR valve in the EGR system, and
   in the EGR system, causing the EGR valve to be open in an amount correlated with the data value for the amount of opening of the EGR valve.

9. A method as set forth in claim 8 wherein the data value for desired mass airflow through the engine is developed by processing data values for present engine speed and present indicated engine torque according to a desired mass airflow map containing data values for desired mass airflow, each of which is correlated with a set of data values for engine speed and indicated engine torque, to select from the desired mass airflow map a data value for desired mass airflow that is correlated with the data values for present engine speed and present indicated engine torque.

10. A diesel engine comprising:
    an exhaust system comprising a diesel particulate filter (DPF) for trapping diesel particulate matter (DPM) in exhaust gas passing through the exhaust system;
    an EGR system for recirculating some exhaust gas through the engine;
    and a control system for controlling flow of exhaust gas through the EGR system in consequence of the processing of data by the control system wherein the control system
    a) processes certain data to select a data value for present EGR volumetric efficiency that is based on a predetermined relationship between certain parameters associated with operation of the engine,
    b) processes the selected data value for present EGR volumetric efficiency and certain other data, including data that accounts for present soot accumulation in the DPF, to develop a data value indicative of present total mass flow through the engine during engine operation, and
    c) processes the data value indicative of present total mass flow through the engine and still other data to develop flow control data for controlling flow of exhaust gas through the EGR system, and
    d) controls the flow of exhaust gas through EGR system in accordance with the flow control data.

11. An engine as set forth in claim 10 wherein the control system comprises a map containing data values for EGR volumetric efficiency, each of which is correlated with a set of data values for engine speed and indicated engine torque, and processes data values for present engine speed and present indicated engine torque to select from the map a data value for present EGR volumetric efficiency that is correlated with the data value for present engine speed and the data value for present indicated engine torque.

12. An engine as set forth in claim 11 wherein the control system comprises a multiplier map containing data values for a multiplier, each of which is correlated with a data value for pressure drop across the DPF, processes a data value for present pressure drop across the DPF to select from the multiplier map a data value for the multiplier that is correlated with the data value for present pressure drop across the DPF, multiplies the selected data value for present EGR volumetric efficiency by the data value for the selected multiplier to develop a data value for the product of the multiplication, and uses the data value for the product of the multiplication as the data value for the data accounting for present soot accumulation in the DPF.

13. An engine as set forth in claim 12 wherein
the EGR system comprises an EGR valve that controls flow through the EGR system, and
the control system comprises a valve control map containing data values for an amount of opening of the EGR valve, each of which is correlated with a set of data values for desired EGR mass flow and pressure drop across the EGR valve, and
  i) multiplies the data value indicative of present total mass flow through the engine and a data value for desired EGR percentage to develop a data value for desired EGR mass flow;
  ii) processes the data value for desired EGR mass flow and a data value indicative of present pressure drop across the EGR valve to select from the valve control map a data value for amount of opening correlated with the data value for desired EGR mass flow and the data value indicative of pressure drop across the EGR valve; and
  iii) causes the EGR valve to be open in an amount correlated with the selected data value for the amount of opening.

14. An engine as set forth in claim 13 wherein the control system comprises an EGR percentage map containing data values for desired EGR percentage, each of which is correlated with a set of data values for engine speed and indicated engine torque, develops a data value for desired EGR percentage by processing data values for present engine speed and present indicated engine torque to select from the EGR percentage map a data value for desired EGR percentage that is correlated with the data values for present engine speed and present indicated engine torque.

15. An engine as set forth in claim 12 wherein the EGR system comprises an EGR valve that controls flow through the EGR system, and the control system
  i) multiplies the data value for the product of the multiplication and a data value for desired mass airflow through the engine to develop a data value for corrected desired mass airflow through the engine;
  ii) processes the data value for corrected desired mass airflow through the engine and a data value indicative of actual mass airflow through the engine to develop a data value for a mass airflow error signal;
  iii) processes the data value for the mass airflow error signal through a proportional-integral-derivative control function to develop a data value for an amount of opening of an EGR valve in the EGR system; and
  iv) causes the EGR valve to be open in an amount correlated with the data value for the amount of opening of the EGR valve.

16. An engine as set forth in claim 15 wherein the control system comprises a desired mass airflow map containing data values for desired mass airflow, each of which is correlated with a set of data values for engine speed and indicated engine torque, and develops the data value for desired mass airflow through the engine by selecting from the desired mass airflow map a data value for desired mass airflow that is correlated with the data values for present engine speed and present indicated engine torque.

17. A system for counteracting the effect of soot accumulation in a diesel particulate filter (DPF) in an exhaust system of a diesel engine on the control of exhaust gas recirculation (EGR) through an EGR system of the engine, the system comprising:
a processor for processing data and performing a control function based on a result of data processing, wherein the processor
  a) processes certain data to select a data value for present EGR volumetric efficiency that is based on a predetermined relationship between certain parameters associated with operation of the engine,
  b) processes the selected data value for present EGR volumetric efficiency and certain other data, including data that accounts for present soot accumulation in the DPF, to develop a data value indicative of present total mass flow through the engine during engine operation, and
  c) processes the data value indicative of present total mass flow through the engine and still other data to develop flow control data for controlling flow of exhaust gas through the EGR system, and
  d) controls flow of exhaust gas through the EGR system based on the flow control data.

18. A system as set forth in claim 17 wherein the processor comprises and executes an algorithm for controlling EGR flow that is based a relationship of EGR flow being proportional to the square root of the difference between pressure in an exhaust manifold of the engine and pressure in an intake manifold of the engine.

19. A system as set forth in claim 17 wherein the processor comprises and executes an algorithm for controlling EGR flow that is based on a relationship of the sum of EGR flow and mass airflow into the engine being a constant at any given combination of EGR flow and mass airflow.

20. A system as set forth in claim 17 wherein the processor processes data values for present engine speed and present indicated engine torque according to a map containing data values for EGR volumetric efficiency, each of which is correlated with a set of data values for engine speed and indicated engine torque, by selecting from the map a data value for present EGR volumetric efficiency that is correlated with the data value for present engine speed and the data value for present indicated engine torque.

21. A system as set forth in claim 20 wherein the processor processes a data value for present pressure drop across the DPF according to a multiplier map containing data values for a multiplier, each of which is correlated with a data value for pressure drop across the DPF, by selecting from the multiplier map a data value for the multiplier that is correlated with the data value for present pressure drop across the DPF, multiplies the selected data value for present EGR volumetric efficiency by the data value for the selected multiplier to develop a data value for the product of the multiplication, and uses the data value for the product of the multiplication as the data value for the data accounting for present soot accumulation in the DPF.

22. A system as set forth in claim 21 wherein the processor multiplies the data value indicative of present total mass flow through the engine and a data value for desired EGR percentage to develop a data value for desired EGR mass flow, processes the data value for desired EGR mass flow and a data value indicative of present pressure drop across an EGR valve in the EGR system according to a valve control map containing data values for an amount of opening for the EGR valve, each of which is correlated with a set of data values for desired EGR mass flow and pressure drop across the EGR valve, by selecting from the valve control map a data value for amount of opening correlated with the data value for desired EGR mass flow and the data value indicative of present pressure drop across the EGR valve, and causes the EGR valve to be open in an amount correlated with the selected data value for the amount of opening.

23. A system as set forth in claim 22 wherein the processor develops a data value for desired EGR percentage by processing data values for present engine speed and present indicated engine torque according to an EGR percentage map containing data values for desired EGR percentage, each of which is correlated with a set of data values for engine speed and indicated engine torque, by selecting from the EGR percentage map a data value for desired EGR percentage that is correlated with the data values for present engine speed and present indicated engine torque.

24. A system as set forth in claim 21 wherein the processor multiplies the data value for the product of the multiplication and a data value for desired mass airflow through the engine to develop a data value for corrected desired mass airflow through the engine, processes the data value for corrected desired mass airflow through the engine and a data value indicative of actual mass airflow through the engine to develop a data value for a mass airflow error signal, processes the data value for the mass airflow error signal through a proportional-integral-derivative control function to develop a data value for an amount of opening of an EGR valve in the EGR system, and causes the EGR valve to be open in an amount correlated with the data value for the amount of opening of the EGR valve.

25. A system as set forth in claim 24 wherein the processor develops a data value for desired mass airflow through the engine by processing data values for present engine speed and present indicated engine torque according to a desired mass airflow map containing data values for desired mass airflow, each of which is correlated with a set of data values for engine speed and indicated engine torque, by selecting from the desired mass airflow map a data value for desired mass airflow that is correlated with the data values for present engine speed and present indicated engine torque.

* * * * *